(12) United States Patent
Deussen et al.

(10) Patent No.: US 10,645,764 B2
(45) Date of Patent: May 5, 2020

(54) HEATABLE CONTAINER FOR LIQUID

(71) Applicant: Elkamet Kunststofftechnik GmbH, Biedenkopf (DE)

(72) Inventors: Martin Deussen, Marburg (DE); Marco Emrich, Ulrichstein (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 30 days.

(21) Appl. No.: 15/558,566

(22) PCT Filed: Mar. 14, 2016

(86) PCT No.: PCT/EP2016/055453
§ 371 (c)(1),
(2) Date: Sep. 15, 2017

(87) PCT Pub. No.: WO2016/150744
PCT Pub. Date: Sep. 29, 2016

(65) Prior Publication Data
US 2018/0063896 A1 Mar. 1, 2018

(30) Foreign Application Priority Data
Mar. 20, 2015 (DE) .................. 10 2015 104 239

(51) Int. Cl.
*H05B 6/10* (2006.01)
*F01N 3/20* (2006.01)
*F01N 13/16* (2010.01)

(52) U.S. Cl.
CPC ............. *H05B 6/108* (2013.01); *F01N 3/206* (2013.01); *F01N 3/2066* (2013.01); *F01N 13/16* (2013.01);
(Continued)

(58) Field of Classification Search
CPC .. F01N 13/16; F01N 2240/05; F01N 2240/16; F01N 2530/18; F01N 2610/02;
(Continued)

(56) References Cited

U.S. PATENT DOCUMENTS

| 2,393,541 | A | 1/1946 | Kohler |
| 3,391,846 | A | 7/1968 | White |

(Continued)

FOREIGN PATENT DOCUMENTS

| DE | 202006001760 U1 | 4/2006 |
| DE | 102010023520 A1 | 12/2011 |

(Continued)

*Primary Examiner* — Phutthiwat Wongwian
*Assistant Examiner* — Diem T Tran
(74) *Attorney, Agent, or Firm* — Leydig, Voit & Mayer, Ltd.

(57) ABSTRACT

A heatable liquid container made of plastic material include a container wall that defines an interior of the container. The container wall at least partially consists of the plastic material which contains inductively heatable additives. An electrically actuatable magnetization unit is associated with the liquid container and operable to generate a magnetic alternating field such that the inductively heatable additives are inductively excited by the magnetization unit so as to directly heat a liquid held in the interior of the container via the container wall.

11 Claims, 3 Drawing Sheets

(52) U.S. Cl.
CPC ...... *F01N 2240/05* (2013.01); *F01N 2240/16* (2013.01); *F01N 2530/18* (2013.01); *F01N 2610/02* (2013.01); *F01N 2610/10* (2013.01); *F01N 2610/1406* (2013.01); *Y02T 10/24* (2013.01)

(58) Field of Classification Search
CPC ......... F01N 2610/10; F01N 2610/1406; F01N 3/206; F01N 3/2066; H05B 6/108; Y02T 10/24
USPC .......................................... 60/286, 300, 303
See application file for complete search history.

(56) References Cited

U.S. PATENT DOCUMENTS

| | | | | |
|---|---|---|---|---|
| 3,396,258 A | * | 8/1968 | Leatherman | B29C 65/3668 156/272.4 |
| 3,462,336 A | * | 8/1969 | Leatherman | B29C 65/3668 156/272.4 |
| 3,745,290 A | * | 7/1973 | Harnden, Jr. | A47J 27/002 219/386 |
| 4,781,304 A | * | 11/1988 | Lapeyre | B65B 51/227 220/280 |
| 2011/0064394 A1 | * | 3/2011 | Bier | F01N 3/2066 392/441 |
| 2014/0373514 A1 | | 12/2014 | Bauer et al. | |

FOREIGN PATENT DOCUMENTS

| | | |
|---|---|---|
| DE | 102010042985 A1 | 5/2012 |
| DE | 102012004727 A1 | 9/2013 |
| EP | 1640577 B1 | 3/2006 |
| GB | 2136098 A | 9/1984 |
| JP | 2001327398 A | 11/2001 |
| WO | WO 2006108437 A1 | 10/2006 |

* cited by examiner

Fig. 3

HEATABLE CONTAINER FOR LIQUID

CROSS-REFERENCE TO PRIOR APPLICATIONS

This application is a U.S. National Stage Application under 35 U.S.C. § 371 of International Application No. PCT/EP2016/055453 filed on Mar. 14, 2016, and claims benefit to German Patent Application No. DE 10 2015 104 239.8 filed on Mar. 20, 2015. The International Application was published in German on Sep. 29, 2016 as WO 2016/150744 A1 under PCT Article 21(2).

FIELD

The invention relates to a heatable liquid container made of plastic material, for instance, thermoplastics such as polyethylene (PE), cross-linked polyethylene (XPE), polypropylene (PP), polyamide 6, 11 or 12 (PA 6, PA 11 or PA 12) or the like, especially for purposes of holding operating media such as ureas or water-urea mixtures, said container having a wall that defines the interior of the container, whereby an electrically actuatable magnetization unit that serves to generate a magnetic alternating field is associated with the container.

BACKGROUND

Various methods for the after-treatment of exhaust gases exist in order to comply with the increasingly stricter emission limit values that are being set for internal combustion engines, particularly in motor vehicles. Especially the after-treatment of the exhaust gases of diesel engines constitutes a problematic aspect in this context since here, the engine operating conditions where the lambda values are markedly greater than 1 do not permit a simultaneous reductive and oxidative after-treatment. For this reason, in order to reduce the nitrogen oxides ($NO_x$) contained in the exhaust gas, catalytic converters, among other things, are employed for a selective catalytic reduction (SCR) of the nitrogen oxides. However, ammonia has to be added as an additional component for the reaction that takes place in the catalytic converter.

As a rule, the ammonia is injected in the form of a 32.5% aqueous urea solution from a reservoir present in the vehicle. This urea solution is uniformly referred to by the industry as ADBLUE or else as Diesel Exhaust Fluid (DEF) in the United States, and its formulation is described in German standard DIN 70070.

Since the freezing point of this urea solution is at about −11° C., however, the risk exists that the solution might freeze in the vehicle's tank, depending on the season of the year or on the region involved.

For this reason, the state of the art describes the approach of equipping the liquid container with a heating arrangement which prevents the freezing or the jellification of the urea that precedes its complete freezing and which also allows frozen urea solution to thaw at the time of a cold start. Familiar measures comprise the subsequent insertion of a separate heating coil in the container after it has been shaped. Subsequently installed heating elements, however, entail the drawback that the heating performance and the spatial distribution of the heating element in the interior of the container are limited by the size of the opening that is provided in the container wall for the installation of the heating element. Compensating for the insufficient heat-exchanging surface area by setting a higher feed temperature, however, is only possible to a limited extent since the urea solution becomes unusable at elevated temperatures due to thermal degradation. This is why local overheating has to be avoided.

Another approach consists of integrating a heating arrangement directly into the container during its production. British patent application GB 2 136 098 A discloses a heatable tank that is made of plastic by means of rotational molding and that has a heating coil. The heating coil is secured inside the tank by means of connectors that are integrated into the side walls of the water tank. The heating coil installed in the tank exits from the tank at two places where it is held by a clamped connection using the connectors. The connectors are fused into the side wall of the tank during the production process and they have one end which projects towards the outside of the tank and which can be used to connect lines for feeding in or discharging heating media.

European patent specification EP 1 640 577 B1 discloses a heatable plastic tank in which the heating medium inlet and the heating medium outlet of a heating spiral that projects into the tank have plastic sintered around them in the lower area on the plastic wall of the tank. This causes the heating spiral to be immovably affixed in the tank. German utility model DE 20 2006 001 760 U1 discloses a plastic container that serves to hold a urea-water mixture in which piping is integrated or embedded as a heating element directly into the container wall and is connected to the cooling system of an engine. A problem of integrated systems, however, is that holes are needed in the container wall for the electric or liquid-carrying lines in order to operate the heating spiral since these holes entail the risk of leakage.

In order to dispense with lines that pass through the container wall, German patent application DE 10 2010 042 985 A1 puts forward a tank arrangement with a heating arrangement having a heating element in the form of a metal element that is arranged in the interior of the tank and that is designed to provide inductive heating. An electrically actuatable magnetization unit is provided adjacent to the heating element and it is separated from the heating element by the container wall. The solution proposed in this publication is based on the principle of inductive heating of electrically conductive elements. The magnetization unit generates a magnetic alternating field that excites the metal element. The magnetic field creates eddy currents in the metal element and they heat up the metal of the metal element by virtue of the ohmic resistance. In this process, the heat is created directly in the metal element itself and does not have to be transmitted by heat conduction. The metal element arranged on the inner wall of the container transmits the heat directly to the liquid. Generally speaking, this approach can be described as inductive heating of the fluid. The advantage consists especially in that it is possible to dispense with electric lines that pass through the container wall to the heating element that is arranged in the interior.

SUMMARY

In an embodiment, the present invention provides a heatable liquid container made of plastic material including a container wall that defines an interior of the container. The container wall at least partially consists of the plastic material which contains inductively heatable additives. An electrically actuatable magnetization unit is associated with the liquid container and operable to generate a magnetic alternating field such that the inductively heatable additives are inductively excited by the magnetization unit so as to directly heat a liquid held in the interior of the container via the container wall.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The inventors have recognized as a drawback of the approach described above the need to put the metal element in place during the production process. The metal element has to be fused into the container wall at the desired place or else it has to be subsequently firmly installed there, which is fundamentally associated with an additional production step. Moreover, the incorporation of the metal element also involves restrictions pertaining to the shape of the container. Asymmetrical and particularly complex container shapes are unsuitable for the metal element. The metal element would have to be adapted to the container shape, which is associated with extra work in view of the increasing package requirements. The efficiency of the heating of the fluid is detrimentally affected by this. Another problem recognized by the inventors is that the magnetization unit has to be situated in the immediate vicinity of the metal element, which gives rise to limitations in terms of the thickness of the container wall.

According to an embodiment, the present invention provides a liquid container of the generic type which makes it possible to attain more efficient heating of the liquid held in the container while improving the production process.

In the case of a liquid container according to an embodiment of the invention, the container wall consists at least partially of an inductively heatable plastic material containing additives or components by means of which the plastic can be heated inductively. The plastic material or the additives contained therein can be inductively excited by the magnetization unit so that a fluid held in the interior of the container can be heated directly via the container wall. In contrast to the prior-art measures which involve heating elements that are arranged in the interior of the container or that are sintered into the container wall, in this case, the container wall is heated directly due to its inductively heatable additives, as a result of which there is no need for a separate heating element to be placed into the container wall or to be arranged in the interior of the container.

Thanks to the possibility of heating the container wall directly, a great deal of design freedom for the shape of the operating media container is attained. Moreover, the production process is greatly simplified as a result. It is fundamentally possible for only sections of the liquid container to be made of inductively heatable plastic, so that the liquid container only consists partially of inductively heatable plastic. Of course, the entire liquid container or at least a layer of the container wall can also be made of inductively heatable plastic.

Preferably, the liquid container is an operating media container, especially a container for urea or a urea-water mixture.

Rotational molding is particularly well-suited for the production of the container. However, the liquid container can also be produced by means of blow molding, thermoforming, vacuum forming or injection molding. In the case of rotational molding, a starting material in the form of a plastic or a plastic precursor is placed into a rotational mold and then shaped as the mold rotates.

In rotational molding, the plastic containers are normally produced by means of a rotational molding tool. A familiar production method provides that a weighed quantity of plastic material in the form of powder, pellets, micropellets or the like is placed as the starting material into a hollow mold whose inner surface defines the outer surface of the plastic container. The mold is then made to rotate around two axes that are usually arranged perpendicular to each other. Heat is introduced into the rotational mold. The rotational speeds of the rotational molds are so low that centrifugal forces only have a small impact in comparison to the force of gravity. The plastic material starts to melt and to be deposited onto the inside of the rotational mold, giving the plastic container its later shape. This widespread variant of the rotational molding process makes use of thermoplastics such as polyethylene (PE), polypropylene (PP), polyamide 6 (PA6), polyamide 11 (PA11) or polyamide (PA12), polycarbonate (PC) and the like. The processing temperatures have to lie above the melting or softening temperature of the plastic material in question.

Some plastics, especially thermoplastics having a very high melting or softening temperature, for instance, PA6 or thermoset materials, which by nature cannot be used for thermoplastic processing, are preferably processed by means of rotational molding in a likewise familiar manner in that a chemical precursor of the material envisaged for the molded part is employed as the starting material, the so-called plastic precursor, and it is then placed as a melt in liquid form into the rotational mold where, under rotation and simultaneous shaping or forming, it reacts chemically, particularly polymerizes, in order to form the final plastic material. This method is advantageously employed, for example, for the production of molded parts made of polyamide 6 (PA6), polyamide 12 (PA12) or their copolymers, whereby the corresponding lactams are used, in other words, for instance, caprolactam and/or laurolactam, which are present in solid form at room temperature under normal conditions, but which are processed in the rotational molding method as a melt with a very low viscosity (in the order of magnitude of 10 mPa·s, that is to say, approximately like water). This method variant allows the production of plastic molded parts while circumventing the high temperatures required for thermoplastic processing, and the processing temperature is preferably kept below the melting temperature of the finished plastic.

The polymerization reactions of dicyclopentadiene (DCPD) to form polydicyclopentadiene (PDCPD, e.g. TELENE made by Rimtec Corp.) or of cyclic butylene terephthalate (e.g. CBT made the Cyclics company) to form polybutylene terephthalate (PBT) are also employed in rotational molding. Moreover, it is a known procedure to produce molded parts out of polyurethane (PU) by rotational molding in that diisocyanates and/or polyisocyanates are reacted with diols and/or polyols as the plastic precursors.

The last cited material systems have in common the fact that the produced molded part consists of a plastic material that is only formed during the shaping—also referred to as forming—in the rotational molding tool from a starting material in the form of a plastic precursor that is initially present in more or less liquid form in the rotational molding tool and that reacts chemically, especially polymerizes, during the shaping procedure.

For purposes of systematically imparting the plastic material with the desired properties, it is provided that at least one component is embedded as an additive into the starting material, and said component is configured to render the plastic material inductively heatable.

According to an embodiment of the invention, the plastic material of the container wall can contain additives or components by means of which the plastic can be heated inductively. Thus, inductively heatable, for example, electrically conductive additives can be added to the appertaining starting material which can be in solid form or as a melt. In this manner, the plastic material can contain electrically conductive and/or magnetic, especially ferromagnetic or ferrimagnetic, particles.

Examples of suitable ferromagnetic metals include iron (Fe), cobalt (Co), nickel (Ni), or ferromagnetic alloys consisting, for instance, of iron, aluminum, nickel, copper and cobalt ("alnico"), those made of samarium, iron and cobalt as well as Heusler alloys consisting of the metals copper, aluminum and manganese.

Suitable ferrimagnetic additives include ferrites having the general formula $M^{II}O.Fe_2O_3$ such as, for instance, magnetite ($M^{II}$=Fe, in other words, $FeO.Fe_2O_3$=$Fe_3O_4$), whereby manganese (Mn), cobalt (Co), nickel (Ni), copper (Cu), zinc (Zn), magnesium (Mg) or cadmium (Cd), either on their own or in mixtures, are likewise options as bivalent metals $M^{II}$.

The inductively heatable additives can be added to the plastic, for example, in the form of chips, filings, powders, granules, other particles or nanoparticles. The magnetic additive can be provided as an alternative or in addition to the embedded magnetic components.

The incorporated additives allow inductive heating of the container wall which, in the case of ferromagnetic or ferrimagnetic additives, is based on re-magnetization losses (hysteresis losses). In the case of electrically conductive additives, fundamentally speaking, ohmic losses caused by inductively generated eddy currents can also be a contributing factor. In the case of additives that are concurrently electrically conductive and magnetic, both effects can contribute to the heating. Which mechanism contributes to the heating depends—aside from the electric conductivity—on the frequency of the magnetic alternating field as well as on the particle size.

Whereas hysteresis losses should be avoided to the extent possible in many technical applications, additives consisting of magnetic materials having the broadest possible hysteresis curve, that is to say, having high remanence magnetization and high coercive field strength, are particularly suitable for the present invention. Such materials are also referred to as being "magnetically hard" or "hard-magnetic".

A reliable temperature limitation can be achieved by selecting magnetic additives that have a Curie temperature $T_C$ that is matched with the desired maximum temperature. In this context, the desired maximum temperature can be determined either in terms of the temperature resistance of the filling medium or in terms of the temperature resistance of the plastic of the container wall. Suitable additives are known to the person skilled in the art, for example, from U.S. Pat. No. 2,393,541 (ferromagnetic materials) or from U.S. Pat. No. 3,391,846 (ferrimagnetic materials; although they are designated as "anti-ferromagnetic" in that publication).

The inductively heatable additives can be placed together with the starting material into the rotational mold, where they mix with the plastic material. However, they can also be compounded into the starting material ahead of time.

In the case of a solid starting material, the additives can be mixed, for instance, with the particles of the plastic material or else be tumbled onto them (dry blend), or else be placed into the mold separately, where they are then mixed with the plastic material. Preferably, the additives are thoroughly mixed with the plastic material by means of compounding, so that the interior of the plastic particles is filled with the additives, thereby ensuring an especially tight bond between the plastic particles and the additives. In this case, it is also sufficient if only some of the plastic particles contain additives.

The inductively heatable properties can also be fundamentally imparted to the plastic material chemically in that, for example, substituents are present on the polymer chain or monomer units are present in the polymer chain, which have a magnetic susceptibility $X>0$, preferably $X>>0$. Also in this case, mixtures of magnetic and non-magnetic plastic particles can be used, whereby the basic material, the dyeing, the additivation as well as the other properties of the plastic material for magnetic and non-magnetic particles can be either identical or different.

Owing to the additives, the container wall can be directly heated inductively and can thus produce heat. The heat can then be transferred directly to the fluid.

In order to produce a liquid container that has only one inductively heatable area, a magnetic element can be installed in the rotational mold before the starting material consisting of one part with and one part without magnetic additives is placed into the rotational mold. While the rotational mold is being made to rotate, the magnetic element attracts the part of the starting material that contains magnetic additives and then holds them firmly. Thus, the use of the magnetic element allows sharply contoured and delimited areas of the inductively heatable plastic to be created in a targeted manner since the material can be guided by the magnetic element. The inductively heatable components are guided systematically by the magnetic element.

A magnetizing coil can be fundamentally employed as the magnetization unit. Therefore, according to another embodiment of the invention, it is provided for the container to have a magnetizing coil that serves to inductively excite the inductively heatable plastic. The magnetization unit can be actuated electrically in order to generate a magnetic alternating field.

Another advantageous embodiment provides that the magnetizing coil through which current can flow is integrated into the container wall or else attached to it. For production purposes, a rotational mold, for instance, can be fitted with a magnetizing coil before the starting material is placed into the rotational mold. During the rotational molding process, the magnetizing coil is incorporated into the container wall and integrally bonded to the container. In this context, the magnetizing coil can be completely incorporated into the container wall, except for the electric connectors. However, it is likewise possible for the magnetizing coil to be incorporated into the container wall in such a way that it is externally flush with the container wall but is nevertheless accessible from the outside. Of course, the magnetization unit can also be subsequently installed on or in the vicinity of the container wall.

According to another embodiment of the invention, it can be provided that several magnetizing coils are arranged at different filling levels of the liquid container. This ensures that the fluid is optimally heated at every filling level of the container.

According to another embodiment of the invention, the magnetization units are configured so that they can be activated separately from each other, at least in groups. Thus, whenever necessary, individual local areas of the container can be inductively heated. Particularly in conjunction with several magnetization units located at various filling levels of the container, the heating can be systematically regulated, for example, as a function of the filling level of the container. In this context, for instance, groups of magnetization units that are associated with a common filling level can be actuated by a regulator once the liquid held in the container has reached a given level where the magnetization units are situated. Therefore, another embodiment of the invention provides for means such as a control and/or regulation unit that is configured to actuate the magnetization units as a function of the filling level of the liquid container. Sensors known from the state of the art can be employed to ascertain the filling level.

Another embodiment of the invention provides that the container is structured with two or more layers, at least in one area that consists of or has the inductively heatable plastic. The inductively heatable plastic is preferably arranged on the inside of the container.

In order to ensure optimal heat guidance in the interior of the container, another embodiment of the invention provides that the inductively heatable plastic is covered towards the outside of the container with another plastic layer made of material that is not inductively heatable. The magnetization unit and the area of the container that is made of inductively heatable plastic can be separated from each other by another plastic layer. This plastic layer can be made of plastic that is hardly or not at all inductively heatable.

A non-heatable plastic layer can be created in that no inductively heatable additives are added to the starting material. This additional plastic layer preferably forms the outer layer of the plastic container. This ensures that only the inner layer is inductively heated. For this purpose, it has proven to be advantageous if the inductively heatable plastic forms an inner layer of the container that can come into direct contact with a liquid held in the container.

The magnetization units can be fundamentally arranged on or in an outer layer or else in an intermediate layer.

According to another embodiment of the invention, it is provided for an insulation layer to be formed between a layer consisting of inductively heatable plastic and another plastic layer. The essential characteristic of such an insulation layer is that it has a lower thermal conductivity than the other or the adjacent layers of the wall of the molded part.

According to another embodiment of the invention, it is provided for the insulation layer to be made of foamed material, a measure which accounts for a high insulating effect.

When it comes to producing a multilayered liquid container by means of rotational molding, in a first step, the rotational mold is filled with a first starting material that forms a plastic that, for example, is not inductively heatable. Subsequently, the rotational mold is made to rotate and heat is introduced into the rotational mold, as a result of which a first layer consisting of the first plastic material is formed.

Subsequently, the rotational mold is filled with another plastic material to which, however, additives have been added which render the plastic inductively heatable. As in the preceding step, the rotational mold is made to rotate around the main and secondary axes of rotation and heat is introduced. Multilayered containers can be produced by means of this basic method. The magnetization unit can be attached in the rotational mold in advance, for instance, during the production of the first layer, as a result of which it is situated in the outer layer. As an alternative, the rotational mold can be configured in such a way that a depression, a recess or a molded through hole is formed on the container contour that is provided to accommodate the magnetization unit and that serves as installation space for the magnetization unit.

Fundamentally, the present invention is not restricted to liquid containers. Other molded parts that are made at least partially of inductively heatable plastic are also encompassed by embodiments of the present invention.

Figure 1:
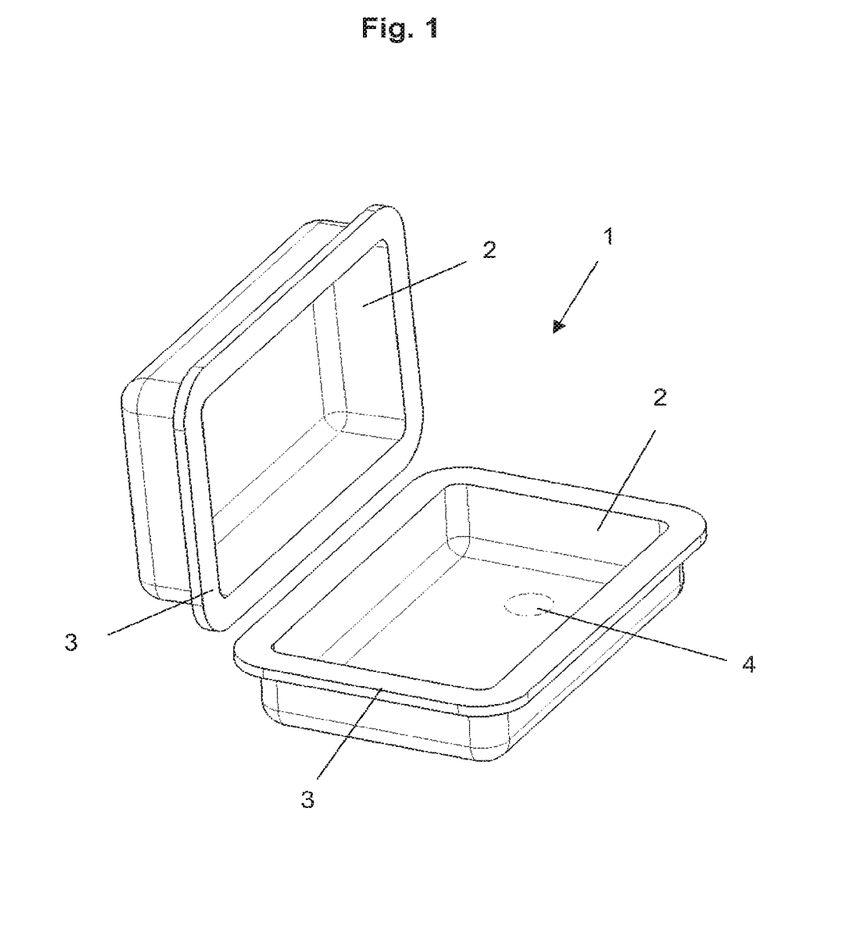
FIG. 1: a rotational mold for the production of a liquid container according to an embodiment of the invention.

FIG. 1 shows a rotational molding tool in the form of a rotational mold 1 for the production of a molded part, especially a container, which is made of plastic by means of rotational molding and having inner walls 2 whose contour defines the outer contour of the finished molded part. The rotational molding tool 1 consists of two half shells that are put together along their flange-like edges 3, thus forming a hollow vessel. A magnetic element 4 in the form of a permanent magnet is installed on the outside of the bottom area of the rotational mold 1. In the open state shown in FIG. 1 or else via an opening, the rotational molding tool 1 is filled with a first starting material in the form of a plastic precursor or in the form of a plastic that forms a melt when exposed to heat. Heat is introduced into the rotational mold 1 using an oven and the rotational mold 1 is made to rotate around two axes arranged perpendicular to each other. The plastic precursor polymerizes or the plastic melts and starts to be deposited onto the inside of the rotational mold, a process in which the plastic container is imparted with its later shape.

The first starting material is not magnetic and cannot be heated inductively. For this reason, it does not interact magnetically with the magnetic element 4, but rather, becomes uniformly distributed in the rotational mold.

Once this first plastic layer has been shaped, the rotational mold is filled with a second starting material in the form of a plastic that melts or sinters upon exposure to heat. The second starting material consists of a mixture of a plastic into which magnetite power has been compounded as well as a plastic without such an additive. The plastic particles with magnetite additives are attracted and held firmly by the magnetic element 4. As a result, an inductively heatable section of the container wall is formed in the second, inner layer in the area of the magnetic element 4.

After the container has been shaped, a magnetization unit can be attached, for example, to the outside of the container wall, so that a magnetic alternating field generated by the magnetization unit can interact with the inner plastic layer and can inductively heat it. The inner plastic layer is in direct contact with the liquid held in the container, as a result of which the heat is optimally transferred into the medium that is to be heated. It is fundamentally possible to dispense with the magnet 4 so that the inner layer of the container has the property of being uniformly inductively heatable.

Figure 2:
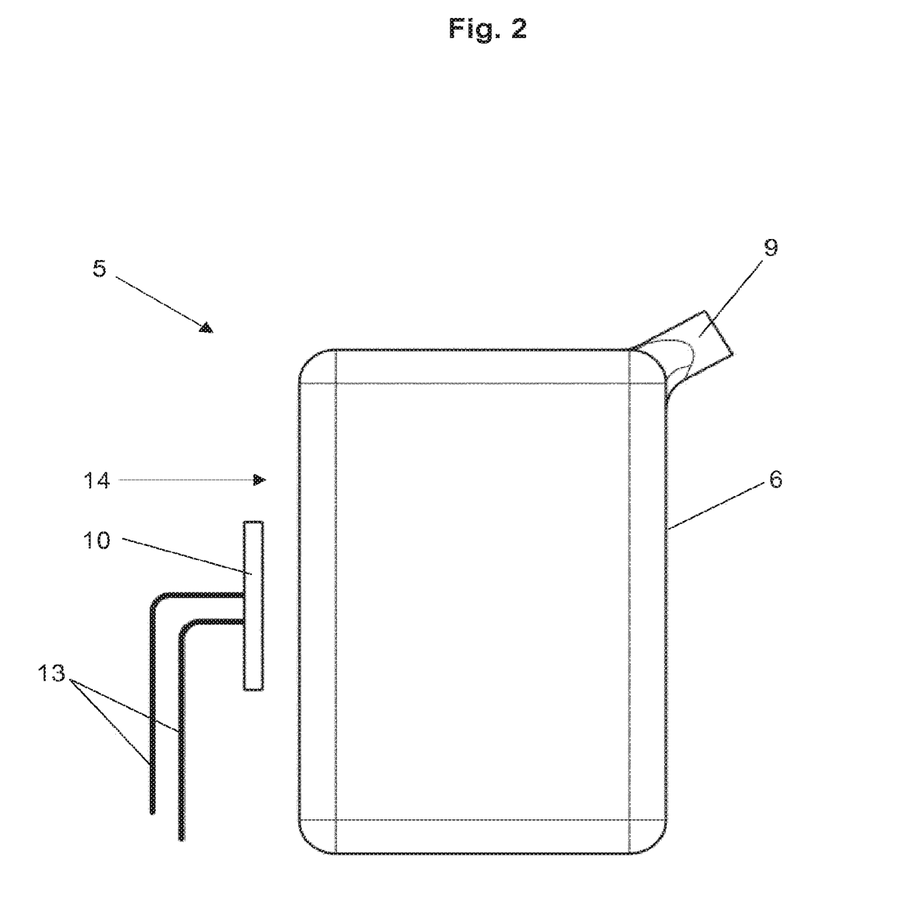
FIG. 2: a side view of a liquid container according to an embodiment of the invention.

FIG. 2 shows a side view of a liquid container 5 according to an embodiment of the invention. The liquid container 5 has a wall 6 which is associated in a side area 14 with a magnetization unit in the form of a magnetizing coil 10. The magnetizing coil 10 is connected via electric connectors 13 to an alternating-current generator (not shown here). The container wall 6 comprises one layer and consists of a plastic material that is inductively heatable or else it contains inductively heatable additives, as already explained above with reference to FIG. 1. When the coil 10 is excited with alternating current, a magnetic alternating field is created that brings about inductive heating of the container wall 6 in the area of the coil 10. This brings about the heating of the fluid that is being held inside the container and that comes into contact with container wall 6.

Figure 3:
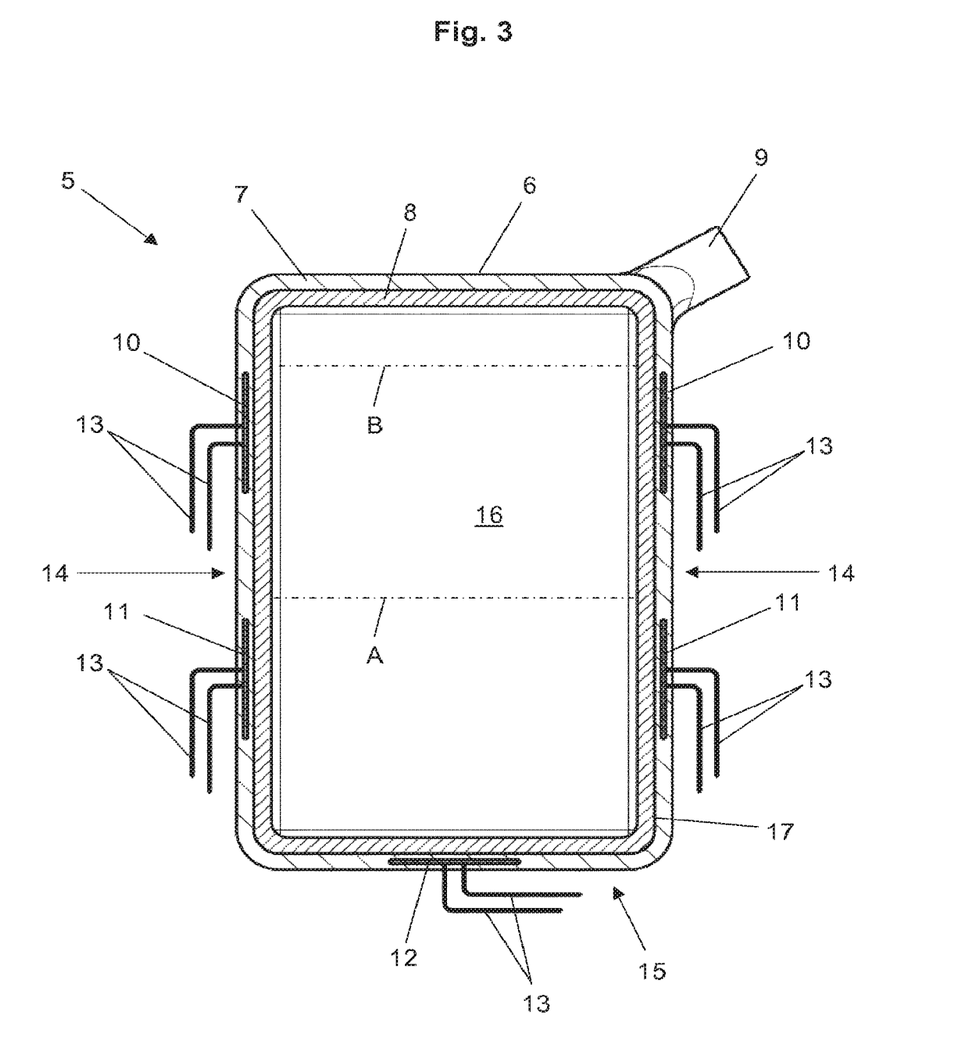
FIG. 3: a sectional view of a liquid container according to another embodiment of the invention.

FIG. 3 shows a sectional view of a liquid container 5 in accordance with another embodiment of the invention. The liquid container 5 has a container wall 6 consisting of several plastic layers. An outer layer 7 surrounds an inner layer 8. The inner layer 8 forms the internal layer that is in direct contact with liquid held in the interior 16 of the container 5. A connection piece 9 that can be closed with a cover (not shown here) is shaped onto or attached to an upper end of the container 5. Filling means can be inserted into the container 5 via the connection piece 9. Withdrawal devices for withdrawing the fluid from the container 5 as well as other devices such as a temperature sensor, a quality sensor, a filling-level sensor, a drain plug or the like can be arranged in the container 5 or on other connection openings situated in the container wall 6.

The outer layer 7 consists of a plastic material that is not inductively heatable, or else no magnetic or other inductively heatable additives have been added to the starting material of which the plastic is made.

The inner plastic layer 8, in contrast, is inductively heatable. As shown in conjunction with FIG. 1, additives are added to the starting material and they render the plastic layer 8 inductively heatable. A plurality of magnetization units 10, 11 and 12 in the form of magnetizing coils are embedded into the outer plastic layer 7. The magnetizing coils are arranged in groups at various filling levels of the liquid container. The magnetizing coils 10 to 12 can each be actuated by electric connectors 13, either individually or else in groups.

A first group of magnetization units 10 is arranged above a second group of magnetization units 11 in side areas 14 of the container 5. A third group of magnetization units 12 is situated in a bottom area 15 of the container 5.

If the interior 16 of the container is almost completely filled with an operating medium, for instance, an aqueous urea solution, which is indicated by the filling level B, then all of the magnetizing coils 10 to 12 can be activated in order to heat the fluid held in the liquid container 5. Due to the magnetizing coils 10 to 12, the plastic of the inner layer 8 is excited by the magnetic alternating field. Inductive heating of the inner plastic layer 8 occurs in the area of the magnetization units 10 to 12. This heat is transferred directly to the fluid being held in the container 5.

If the filling level of the fluid being held in the liquid container 5 is lower than in the first described case, namely, if it is, for example, at filling level A, then only the group of the lower side magnetization units 11 as well as the magnetization unit 12 in the bottom area 15 are selectively activated.

The selective control or activation of the magnetization units can be actuated by means of a control device (not shown here) that supplies the alternating current to the magnetization units. The control device can also be connected to a filling level sensor (not shown here) that provides the control device with information pertaining to the filling levels A, B of the fluid being held in the liquid container 5. The control device can activate the side magnetization units 10 to 12 selectively as a function of the filling level. A targeted regulation of the heating can be effectively implemented in this manner.

Moreover, between the inner layer 8 and the outer layer 7, there can be an insulation layer 17 that exhibits a lower thermal conductivity than the inner layer 8 or the outer layer 7. This ensures that the thermal energy does not escape to the outside, but rather, is efficiently utilized for heating the fluid being held in the liquid container 5. The insulation layer 17 can be formed in an intermediate step between the production of the outer layer 7 and of the inner layer 8.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 rotational molding tool (rotational mold)
2 inner wall of the rotational molding tool
3 edge
4 magnetic element
5 liquid container
6 container wall
7 outer plastic layer
8 inner plastic layer
9 connection piece
10 magnetization unit (magnetizing coil)
11 magnetization unit (magnetizing coil)
12 magnetization unit (magnetizing coil)
13 electric connector
14 side area
15 bottom area
16 interior of the container
17 insulation layer
A, B filling level

The invention claimed is:
1. A heatable liquid container, comprising:
a container wall that defines an interior of the container, the container wall at least partially consisting of a plastic material which contains inductively heatable particles embedded in the plastic material; and a plurality of electrically actuatable magnetization units which are activatable separately from each other and are arranged at different filling levels of the liquid container, the magnetization units being operable to generate a magnetic alternating field to inductively excite the inductively heatable particles such that a liquid held in the interior of the container is directly heatable at the different filling levels via the container wall.

2. The liquid container according to claim 1, wherein the magnetization units each include a magnetizing coil.

3. The liquid container according to claim 1, wherein the magnetization units are integrated into the container wall or else attached to it.

4. The liquid container according to claim 1, wherein the magnetization units are activatable in groups.

5. The liquid container according to claim 1, wherein the plastic material which contains the inductively heatable particles forms an inner layer of the container wall that is configured to come into direct contact with the liquid held in the liquid container.

6. The liquid container according to claim 1, wherein the container wall includes two or more layers, at least in one area that has the plastic material which contains the inductively heatable particles, and wherein the plastic material which contains the inductively heatable particles is arranged at the interior of the liquid container.

7. The liquid container according to claim 6, wherein the plastic material which contains the inductively heatable particles is covered towards an outside of the liquid container with another plastic layer made of a material that is not inductively heatable.

8. The liquid container according to claim 6, wherein the container wall includes an insulation layer formed between a layer consisting of the plastic material which contains the inductively heatable particles and another plastic layer, the insulation layer having a lower thermal conductivity than the other layers of the container wall.

9. The liquid container according to claim 8, wherein the insulation layer is made of foamed material.

10. The liquid container according to claim 1, wherein the liquid container is a urea container.

11. The liquid container according to claim 1, wherein the liquid container is produced by a rotational molding process.

* * * * *